3,238,085
PROCESS FOR MANUFACTURING CERAMIC-LIKE PRODUCTS FROM GLASS BY MICROSCOPIC CRYSTALLIZATION
Ryozo Hayami, Nada-ku, Kobe, and Hirokichi Tanaka and Toru Ogura, Saita-machi, Ikeda, Japan, assignors to Agency of Industrial Science and Technology, Tokyo, Japan, a corporation of Japan
No Drawing. Filed Nov. 17, 1961, Ser. No. 153,212
Claims priority, application Japan, Dec. 26, 1960, 35/50,176
5 Claims. (Cl. 161—1)

The present invention relates to a process of microscopic crystallization of glass by which ceramic products are manufactured from glass.

Processes are known for manufacturing ceramics of great mechanical strength by putting glass into a state in which it is filled with fine crystals produced therein. Thus, a process is known, in which a shaped article made of a glass of $SiO_2$–$Li_2O$–$Al_2O_3$ system to which a photosensitive metal such as gold, silver or copper has been added is exposed to short-wave radiation to cause these metals to separate fine crystals thereof, which act as nuclei, so that in the subsequent course of pre-heating the glass at a temperature above the annealing temperature fine crystals of lithium metasilicate are formed which act, in turn, as the nuclei for crystallization and facilitate the glass to be transformed in its final heat treatment at a high temperature into a ceramic product. This process, aside from the use of a costly metal which is required, is deficient, in that the irradiation with a special ray adapted as a necessary means in the process proves to be of insufficient effect for causing deep portions of the article to be homogeneously exposed to light, especially in the case of thick-walled articles. According to another known process, on the other hand, $TiO_2$ is added as a substitute for the metals as a nucleating agent to the glass together with at least 50% by weight of crystallizable inorganic ingredients, whereupon the glass is pre-heated at a temperature above the annealing point to form nuclei and then further heated to a high temperature to be converted into a ceramic product. Although the last mentioned process is advantageous in that it enables the formation of nuclei to be carried out without resort to exposure to short wave radiation but merely by heating, it is apt to produce articles rather reduced in its content of fine crystals.

It is, therefore, one object of the present invention to provide a process of manufacturing ceramic products from glass by crystallization, wherein to a glass composition consisting of an $SiO_2$–$Li_2O$ system or a system containing beside the combination of $SiO_2$–$Li_2O$ one or more members selected from CaO, ZnO, CaO, $Al_2O_3$, $B_2O_3$, $Sb_2O_3$ and $CeO_2$ each in an amount less than 50% by weight is added $As_2O_3$ in an amount below 10% by weight, the mixture is melted and formed into articles of desired shape. The shaped products are kept at a temperature in the neighborhood of the yielding point of the glass for a time sufficient to form nuclei therein, and the products are then subjected to heat treatment which is continued at a temperature slightly lower than the yielding point of the products for a period long enough for completing the multiplication of fine crystals.

It is another object of the present invention to provide a process of manufacturing ceramic products from glass by crystallization, wherein to a composition, which has been prepared from an $SiO_2$–$Li_2O$ system or a system containing beside the combination of $SiO_2$–$Li_2O$ one or more members of the abovementioned oxides of metals, each in an amount less than 50%, is added an arsenic compound acting as nucleating agent in an amount less than 10% when calculated as $As_2O_3$ and referred to the total weight of the composition, and then subjected, as described above, to heat treatment. Thus, according to the present invention, any step comprising the addition of a costly metal complemented by exposure to short wave radiation as proposed in the abovementioned known process can completely be dispensed with and microscopic crystallization of glass can be satisfactorily obtained merely by a simple heat treatment. Moreover, it is a noticeable merit of the present process that the products thereby obtained are of higher content of fine crystals and of more advanced ceramic properties as compared with those obtained by the above mentioned known processes. As further merits of the present process are mentioned that the above stated composition does not produce during heat treatment under the above specified conditions any deformation in the shape of treated articles and also that since the fine crystals produced in the glass are multiplied always without growth in particle size, products possessed of uniform distributions of crystals and having large strength against bending can be obtained without difficulty.

When the amount of $As_2O_3$ added according to the present invention to the specified composition of glass is of an amount of 10% and above, the vaporization of $As_2O_3$ takes place so vigorously in the course of melting the glass, that the mass of glass is apt to become locally unhomogeneous and, thus, also leads to an uneven progress of microscopic crystallization as the glass is subjected to the heat treatment. When the added $As_2O_3$ is of an amount of 0.5% and below, on the other hand, the formation of nuclei in the course of pre-heating takes place so insufficiently that there is the danger of leading to the formation of products in the state of an aggregate of coarse crystals and considerably reduced in mechanical strength.

The addition to the glass composition, as devised in accordance with the present invention, of a small amount of oxide of another kind of metal, for example, that (5% and below) of $K_2O$ or $Na_2O$ as applied under certain circumstances, is not only advantageous for the glass to be easily melted, to be protected from devitrification and to be given its shape without difficulty but also effective for excluding certain sorts of defects possible to appear in the time of heat treatment as, for example, crack-formation and coloration.

Furthermore, the addition to the glass composition, as devised in accordance with the present invention, of a small quantity (2–8%) of $MoO_3$ or $WO_3$ has an effect of promoting the microscopical crystallization, while these oxides of heavy metal can effectively be used, if necessary, to replace a part of $As_2O_3$ and, also in some cases, as a supplementary agent that protects the crystallization from becoming blocked.

As regards the working step of heat treatment, the best temperature for attaining the result aimed at by the present invention for the heat treatment is carried out at a temperature slightly lower than the yielding point of the products with a temperature lower by about 50° C.

than the yielding point; the mechanical strength and the heat resistance conferred upon the product at a temperature below this range is deficient, since they are detained on low levels by the difficulty of a smooth progress of crystallization.

The compositions of glass and conditions of heat treatment adopted and some properties of the product obtained according to the present invention will be shown below by a tabular illustration. In the experiments referred to in the table, glass compositions were melted and formed into predetermined shapes, and the shaped products were kept for 30–60 min. at a temperature near the yielding point of the glass, then brought by raising the temperature by 200 C./hr. to a temperature slightly lower than the yielding point of the products and kept for two hours at this temperature. The values for the coefficient of thermal expansion (obtained as the mean of measured values for a temperature range of 50–800° C.) and those for the yielding point were determined by means of a differential thermodilatometer, while the values for the bending strength represented in the table were obtained by measuring the strength against bending (kg./cm.$^2$) for the products formed into rectangular bars, each of 7 cm. in length, 0.7 cm. in both height and width or that shaped into cylindrical bars, each of 7 cm. in length and 0.4 cm. in diameter supported by a span of 5 cm. The table contains also the results of an X-ray analysis for the main types of crystals precipitated in the specimens through the heat treatment thereof.

| No. of experiment | 1 | 2 | 3 | 4 | 5 | 6 |
|---|---|---|---|---|---|---|
| Composition: | | | | | | |
| $SiO_2$ | 81.6 | 77.9 | 37.1 | 56.7 | 50.0 | 48.2 |
| $Li_2O$ | 13.5 | 12.0 | 6.3 | 9.3 | 8.3 | 8.0 |
| $Al_2O_3$ | | 3.8 | 35.4 | 22.0 | 25.0 | 24.1 |
| $CaO$ | | | 8.8 | | 4.6 | 4.5 |
| $K_2O$ | 2.9 | 2.4 | 3.5 | | | 3.6 |
| $As_2O_3$ | 2.0 | 3.8 | 3.5 | 3.7 | 3.7 | 3.6 |
| $WO_3$ | | | 5.3 | 3.7 | 3.7 | 3.6 |
| $B_2O_3$ | | | | 4.0 | | |
| $ZnO$ | | | | | 4.6 | |
| $Sb_2O_3$ | | | | | | 4.5 |
| Crystallization temperature: | 880 | 890 | 960 | 890 | 940 | 940 |
| For formed product after crystallizing heat treatment: | | | | | | |
| Yielding point (° C.) | 930 | 900 | 1,020 | 910 | 970 | 960 |
| Linear coef. of thermal expansion ($10^{-7}$/° C.) | 127.2 | 112.5 | 12.5 | 16.9 | 17.7 | 50.1 |
| Bending strength (kg./cm.$^2$) | 3,200 | 4,000 | 2,000 | 2,210 | 2,150 | |
| Educed crystalline phase | (1) | (2) | (3) | (4) | (5) | (6) |

[1] Lithium disilicate; d-Tridymite.
[2] Lithium disilicate; α-Quartz.
[3] β-Eucryptite; Anorthite.
[4] β-Spodumene.
[5] β-Eucryptite.

The products obtained according to the present invention are white or colored and have a ceramicslike opaque or semi-transparent appearance. While the yielding point of glass is generally in the range of 500–600° C., that of the product here obtained is higher by about 400° C., falling in a range of 900–1050° C. As to the linear coefficient of thermal expansion, while glass generally has a value of $50–110 \times 10^{-7}$, the products can be conferred with any value in a range covering from a negative value to $130 \times 10^{-7}$ inclusive of zero. As compared with glass, any of the present products is of higher bending strength and shows as a rule a value 3–4 times as great as that of the former. In the case of products with great mechanical strength, it was confirmed by microscopic observations, that they consist of an aggregate of fine crystals smaller than 1.

Example 1

A batch comprising $SiO_2$ of 77.9%, $Li_2O$ of 12.0%, $Al_2O_3$ of 3.8% and $K_2O$ of 2.4% (by weight) was added with $As_2O_3$ of 3.8% (by weight). The mixture was fused by heating for 2 hours at 1350° C. and the fused mass was formed into a cylindrical bar of 4 mm. in diameter and 1 cm. in length. The glass here obtained was colorless and transparent, showing no trace of devitrification. It had, in a temperature range of 50–300° C., a mean linear coefficient thermal expansion of $85.0 \times 10^{-7}$ and showed a yielding point of 500° C., as measured by a dilutometric technique. This cylindrical glass bar was kept for 30 minutes at 520° C., then brought to 890° C. by raising the temperature at the rate of 200° C. an hour and kept at this temperature for 2 hours. The product thus obtained was of white opaque ceramic material possessed of a remarkable hardness and had in a temperature range of 50–800° C. a mean linear coefficient of thermal expansion of $112.5 \times 10^{-7}$, the yielding temperature being 900° C. The product showed before and after the above-mentioned heat treatment values of bending strength as 1250 and 4000 kg./cm.$^2$, respectively, indicating that the product was remarkably enlarged in the strength by the favor of the heat treatment performed according to the present invention. Microscopical measurement of the size carried out for the crystals contained showed, that they comprise fine particles smaller than 1μ. According to the result of an X-ray analysis these crystals were found in accordance with those of lithium disilicate and α-quartz, respectively.

Example 2

A batch composed of 56.7% of $SiO_2$, by 9.3% of $Li_2O$, by 22.0% of $Al_2O_3$ and by 4.6% of $B_2O_3$ was added with $As_2O_3$ of 3.7% and $WO_3$ of 3.7% (all by weight), fused, formed and subjected to heat treatment in a similar manner, as described above in connection with Example 1. The product here obtained resembled that obtained according to Example 1, but had a smaller linear coefficient of thermal expansion, the mean value being $16.9 \times 10^{-7}$ in the temperature range of 50–800° C. The yielding point and the bending strength were estimated as 910° C. and 2210 kg./cm.$^2$, respectively. The result of X-ray analysis indicated that the crystals precipitated in the product was of β-spodumene.

While we have disclosed several embodiments of the present invention, it is to be understood that these embodiments are given by example only and not in a limiting sense, the scope of the present invention being determined by the objects and the claims.

We claim:

1. A process of manufacturing ceramic products from glass by microscopic crystallization comprising the steps of
   admixing a glass forming composition consisting essentially of the $SiO_2$–$Li_2O$ system and containing as the essential nucleating agent between 2 and 8% by weight of $As_2O_3$,
   fusing the mixture,
   forming said mixture into a predetermined shape,
   maintaining said shaped product at a temperature in the neighborhood of the yielding point of the glass to produce nuclei therein, and
   then subjecting said product to a heat treatment continued at a temperature slightly lower than the yielding point of said product for a time period long enough for completing the desired multiplication of fine crystals therein.

2. The process, as set forth in claim 1, wherein said $SiO_2$–$Li_2O$ system contains at least one member selected from the group consisting of CaO, ZnO, CdO, CeO, $Sb_2O_3$, $Al_2O_3$ and $B_2O_3$, each at an amount of less than 50% by weight.

3. The process, as set forth in claim 1, wherein 2 to 8% of a supplementary crystallization-promoter is added to said mixture, and
   said supplementary crystallization promoter being selected from the group consisting of $WO_3$ and $MoO_3$.

4. A ceramic product, made as set forth in claim 1, containing 2 to 8% of $As_2O_3$ as a nucleating agent.

5. A ceramic product, made as set forth in claim 1, containing 2 to 8% of a supplementary crystallization promoter selected from the group consisting of $WO_3$ and $MoO_3$.

References Cited by the Examiner

UNITED STATES PATENTS

| | | |
|---|---|---|
| 2,663,658 | 12/1953 | Schurecht. |
| 2,720,473 | 10/1955 | Donahey _____ 106—54 X |
| 2,971,853 | 2/1961 | Stockey _____ 65—33 X |
| 2,998,675 | 9/1961 | Olcott et al. _____ 65—33 X |
| 3,113,009 | 12/1963 | Brown et al. _____ 65—33 |
| 3,117,881 | 1/1964 | Henry et al. |
| 2,971,853 | 2/1961 | Stookey _____ 65—33 X |

DONALL H. SYLVESTER, *Primary Examiner.*